Dec. 1, 1959    B. L. GILBERT ET AL    2,915,639
RADIOISOTOPE TRACER METHOD
Filed Feb. 9, 1956
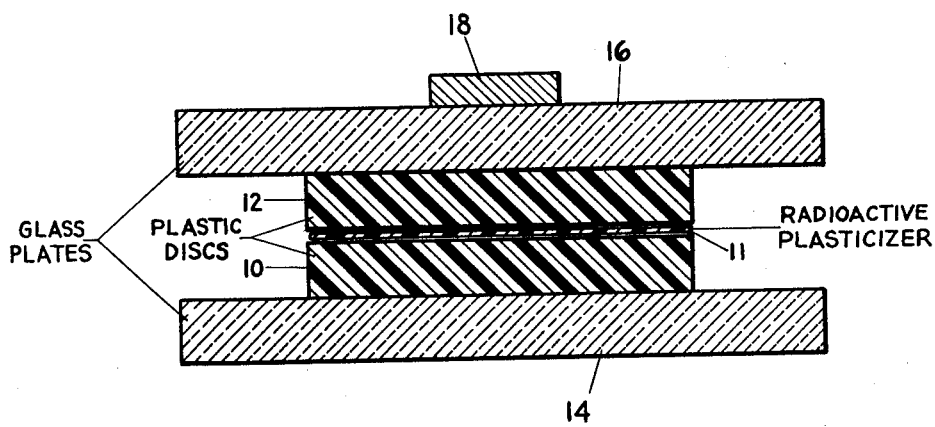
INVENTORS
BERNARD L. GILBERT
JOSEPH L. KALINSKY
WILLIAM F. LAURO
BY
ATTORNEYS

United States Patent Office 2,915,639
Patented Dec. 1, 1959

2,915,639

RADIOISOTOPE TRACER METHOD

Bernard L. Gilbert, New York, Joseph L. Kalinsky, Valley Stream, and William F. Lauro, New York, N.Y., assignors to the United States of America as represented by the Secretary of the Navy Application February 9, 1956, Serial No. 564,590

10 Claims. (Cl. 250—106)

(Granted under Title 35, U.S. Code (1952), sec. 266)

The invention described herein may be manufactured and used by or for the Government of the United States of America for governmental purposes without the payment of any royalties thereon or therefor.

This invention relates to methods for determining migration of materials and more particularly, to a method of measuring the extent and rate of migration of plasticizers through synthetic resin and elastomeric compounds utilizing radioisotope tracer techniques.

As is well known, plasticizers are widely used in the fabrication of resin and elastomeric products. For example, in the construction of electrical power and communication cable, plasticizers play an essential role in the formulation of several of the synthetic resin insulation and sealant components.

Plasticizer migration in plastic compounds is defined as the gradual diffusion of plasticizer from an area of given concentration, to one of lower plasticizer concentration. The consequences of the migration are highly important in many uses of plasticized polymeric material. Excessive migration may cause stiffening of the plastic, and softening and deterioration of other components, which absorb the plasticizer. In communication equipment, this may result in a consequent deleterious effect on the dielectric strength and the power factor of cable insulation.

Various test methods for studying plasticizer migration are known. Many involve dimensional change, such as changes in weight and volume. Aside from requiring several weeks or months to carry out, these test methods present several disadvantages, a chief one of which is a variability in the surface area of contact, an important parameter in plasticizer migration. For example, this disadvantage is present in the method disclosed by J. R. Geenty, in the "India Rubber World," vol. 126 (1952) on page 646. His method of determining plasticizer migration consists of burying a specimen to be tested in activated charcoal or silica gel. Similarly in an article by A. M. Quackenbos, Jr., in "Industrial and Engineering Chemistry," vol. 46 (1954) on page 1335, there is disclosed a method for determining migration of plasticizers by measuring the weight losses of plastics. His (Quackenbos) method, is thus not applicable for determining migration rates of plasticizers through unplasticized resinous materials, such as polyethylene, in contact with a plasticizer resin. It is therefore unable to furnish information on the efficacy of barrier materials, such as those used in power and communication cable to minimize plasticizer migration.

Accordingly, it is the primary object of the present invention to provide a method for determining the extent and rate of migration of plasticizer through synthetic resin and elastomeric compounds.

It is a further object to provide a method as set forth in the preceding object utilizing radioisotope tracer techniques.

In accordance with the present invention, generally speaking, there is provided a method for determining the extent and rate of migration of plasticizer through synthetic resin and elastomer compounds which comprises maintaining a small amount of plasticizer having as one of its constituent elements, a radioisotope of said element in intimate contact with a plastic for a given period at a given temperature and measuring the radioactivity of the plastic thereafter whereby a relationship exists between the amount of the radioactivity and the extent and rate of migration of the plasticizer.

Other objects and many of the attendant advantages of this invention will be readily appreciated as the same becomes better understood by reference to the following detailed description when considered in connection with the accompanying drawing wherein:

The sole figure is an arrangement for carrying through the method of the present invention.

To establish the validity and feasibility of employing radioisotope tracer methods in investigating plasticizer migration, studies were made on two polymeric materials widely employed in cable construction, viz., plasticized polyvinyl chloride, used as a sheathing material, and silicone rubber used as an insulating material. The plasticizer studied was tri-cresyl phosphate (TCP) which is commonly used in many commercial vinyl plastic formulations.

In carrying out the method of the present invention, the vinyl plastics were prepared from stabilized polyvinyl chloride plastisols as films of varying thickness. One formulation for such plastic comprised about 100 parts of polyvinyl chloride resin, known by the trade name Geon 121, about 78 parts of inert tri-cresyl phosphate and about 3.6 parts of stabilizers. Radioactive labeled tri-cresyl phosphate was synthesized from radio-phosphoric acid, i.e., the phosphorus therein being the radioisotope P–32. The tri-cresyl phosphate may be made by a method utilizing as an intermediate, phosphorous oxytrichloride. An improved method of synthesizing P–32 phosphorous oxytrichloride is disclosed in an article by J. L. Kalinsky and A. Weinstein, "Journal of the American Chemical Society," volume 76 on page 5882. The vinyl films, made with inert, or non-radioactive tri-cresyl phosphate were cast on glass plates with a Gardiner film casting knife, and cured in an oven at 135° C. for about one hour. Commercial silicone rubber specimens were used.

Referring now in detail to Fig. 1, there is shown the arrangement for carrying through the method of the present invention. About 3 milligrams of a radioactive plasticizer 11 such as radioactive tri-cresyl phosphate is placed between two plastic discs 10 and 12, consisting of a material such as the vinyl plastic prepared as described above. The sandwich of discs 10 and 12 with radioactive tri-cresyl phosphate therebetween is placed between two piece of plate glass 14 and 16 and weighted with a weight 18, say of about one pound to maintain intimate contact in the arrangement. Several runs are made at differing prescribed temperatures for differing chosen periods, the times and temperatures being so controlled that the radioactive tri-cresyl phosphate never completely penetrates through the plastic discs 10 and 12. With this control, there is effectively provided, an infinite thickness of plastic and an extremely thin layer of radioactivity. Immediately following a run, discs about 0.5 inch in diameter are cored from the central portion of each of the larger discs of the separated sandwich. This is done to minimize any possible edge effects, since the equations used in computing the diffusion coefficient are based upon unidirectional movement. Each of the cored discs is mounted upon the cold stage of a microtome with a $CO_2$ freezing attachment, which has been optically aligned with the microtome knife, the other specimen being chilled to retard additional diffusion while the one specimen is in the process of being sectioned. Several sections, 20–30 microns thick, are sliced from each of the specimens, the number varying with the contact time, or extent of diffusion. A sufficient number of sections are cut, such that the last ones are of negligible or background activity. The sections are then consecutively mounted upon the reverse surfaces of cupped planchets, and counted for activity in a conventional radioactivity counting device such as the "Automatic Sample Changer and Superscaler" manufactured by Tracer Lab. This device will automatically count and recount a series for as many cycles as desired.

In the following table, there is set forth data showing the effect of thickness and temperature on the diffusion of tri-cresyl phosphate in tri-cresyl phosphate plasticized polyvinyl chloride.

| Specimen Thickness (mils) | Duration of Heat (hours) | Temperature (° C.) | Diffusion Coefficient (cm.²/sec.×10³) |
| --- | --- | --- | --- |
| 75 | 2 | 24 | 0.23 |
| 44 | 4 | 24 | 0.24 |
| 45 | 1 | 50 | 0.79 |
| 47 | 5 | 50 | 0.82 |
| 75 | 1 | 75 | 2.22 |
| 44 | 2 | 75 | 2.52 |

The same procedure as outlined above may be followed with other plastic and plastomeric compounds such as silicone rubber, etc. and representative polymeric materials such as polyethylene, terephthalate esters, etc.

It is thus seen that with the present invention there is provided an accurate, quick method for determining both the extent and rate of plasticizer migration and wherein there is no variability in the surface area of contact.

Obviously many modifications and variations of the present invention are possible in the light of the above teachings. It is therefore to be understood that within the scope of the appended claims the invention may be practiced otherwise than as specifically desccribed.

We claim:

1. A method for determining the extent and rate of migration of a plasticizer through resinous and elastomer compounds which comprises maintaining a small amount of a plasticizer having as one of its constituent elements a radioisotope of said element in intimate contact with one of said compounds in static form for a period of time and at a temperature insufficient to enable partial and substantial but incomplete penetration of said one compound by said plasticizer, and thereafter measuring the radioactivity of removed selected portions of said compounds at different distances from said radioisotope whereby a relationship exists between the amount of such radioactivity in said removed portions and the extent and rate of migration of the plasticizer.

2. A method for determining the extent and rate of migration of a plasticizer through resinous and elastomer compounds which comprises maintaining a small amount of radioactive tri-cresyl phosphate in intimate contact with one of said compounds in solid form for a period of time and at a temperature sufficient to enable partial and substantial but incomplete penetration of said one compound by said phosphate, and thereafter measuring the radioactivity of selected removed portions of said compound at different distances from said radioactive phosphate whereby a relationship exists between the amount of said radioactivity in the removed portions and the extent and rate of migration of the plasticizer.

3. A method as defined in claim 1 wherein said tri-cresyl phosphate has as one of its constituent elements the radioisotope P–32.

4. A method of determining the extent and rate of migration of a plasticizer through resinous and elastomer compounds which comprises placing a chosen amount of radioactive tri-cresyl phosphate between the faces of two discs of solid form of one of said compounds, maintaining said discs in intimate face to face contact with the radioactive phosphate between them for a substantial period of time controlling the temperature and period to enable substantial penetration of said discs by the tri-cresyl phosphate, and terminating the contact before said radioactive tri-cresyl phosphate completely penetrates into said discs, removing sections from the interior areas of prescribed portions of said discs, and measuring the radioactivity of sections of said removed sections at different distances from said radioactive phosphate whereby a relationship exists between the amount of said radioactivity and the extent and rate of migration of the plasticizer.

5. A method of determining the extent and rate of migration of a plasticizer through resinous and elastomer compounds which comprises confining a radioisotope of a selected plasticizer against and in contact with a face of a static body of said compound in a stationary condition for a period of time and at a temperature sufficient to enable partial and substantial but incomplete penetration of said body of compound by said plasticizer, then sampling portions of said compound body at different distances thereof from said face in contact with said plasticizer, and separately measuring the radioactivity of each of said sampled portions, whereby a comparison of the radioactivity of said sampled portions at different distances from said plasticizer will indicate the rate and extent of migration of the plasticizer into the compound.

6. The method as set forth in claim 5, wherein said sampling comprises forming cores in the compound extending in a direction from face to face of the compound, and then slicing the cores transversely into layers at different distances from said face engaged by said plasticizer.

7. The method as set forth in claim 5 wherein the plasticizer is tri-cresyl phosphate.

8. The method as set forth in claim 5 wherein the plasticizer is tri-cresyl phosphate and its radioisotope in P–32.

9. The method of determining the extent and rate of migration of a plasticizer through resinous and elastomer compounds which comprises confining a quantity of radioactive tri-cresyl phosphate in a stationary condition against and in contact with a face of said compound in static form for a period of time and at a temperature sufficient to enable partial and substantial but incomplete penetration of the said compound by said phosphate, then sampling sections of said body parallel to said face at different distances from said face, and spaced from the margins of the body, then separately measuring the radioactivity of each of said sampled sections, and then comparing the radioactivities of said sections to determine thereby the extent of migration of said plasticizer in said prescribed periods.

10. The method of determining the extent and rate of migration of a plasticizer through resinous and elastomer compounds which comprises confining a quantity of radioactive tri-cresyl phosphate against and in contact with a face of said compound in static form and against movement over the face, for a period of time and at a temperature sufficient to enable partial and substantial but incomplete penetration of said compound by said phosphate, then sampling sections of said body parallel to said face at different distances from said face, and spaced from the margins of the body, then separately measuring the radioactivity of each of said sampled sections, then comparing the radioactivities of said sections to determine thereby the extent of migration of said plasticizer in said prescribed periods and repeating the sampling, radioactive measurements and comparison, after different time periods and at different temperatures.

References Cited in the file of this patent

Radioactive Isotopes as Tracers, by A. W. Kramer from Power Plant Engineering, November 1947, pp. 105–109.

Investigations of Diffusion and Atomic Interactions in Alloys with the Aid of Radioactive Isotopes, by Kurdiumov, in Proceedings of the International Conference on the Peaceful Uses of Atomic Energy, vol. 15, pages 81–86, Aug. 20, 1955.